United States Patent [19]

Gravely et al.

[11] 3,747,608

[45] July 24, 1973

[54] MICROBIAL DIGESTION OF TOBACCO MATERIALS

[75] Inventors: Lawrence Edmond Gravely; Richard Paul Newton, Jr., both of Louisville, Ky.

[73] Assignee: Brown & Williamson Tobacco Corporation, Louisville, Ky.

[22] Filed: June 18, 1971

[21] Appl. No.: 154,624

[52] U.S. Cl. ............................................. 131/141
[51] Int. Cl. ...................... A24b 03/14, A24b 15/00
[58] Field of Search ..................... 131/140, 141, 17; 195/31 R

[56] References Cited
UNITED STATES PATENTS
3,240,214  3/1966  Bavley et al. .................. 131/141
1,331,331  2/1920  Erslev ............................ 131/141

FOREIGN PATENTS OR APPLICATIONS
1,153,120  5/1969  Great Britain ................... 131/141

OTHER PUBLICATIONS

Kertesz, Z. I., "The Pectic Substances" (Text) Published by Interscience Publishers Inc. N. Y. (1951) Pages 587, 588 and 589 cited.

Bergey's Manual of Determinative Bacteriology (text) by Breed, Murray and Smith –Seventh Edition (1957) Pub. by The Williams and Wilkins Co. Baltimore, Md. pages 355–358 inc. Cited.

*Primary Examiner*—Melvin D. Rein
*Attorney*—Kane, Dalsimer, Kane, Sullivan & Kurucz

[57] ABSTRACT

Microbial digestion of tobacco is disclosed wherein a slurry of the pectin bound tobacco plant matter is treated with an inoculum containing pectolytic-enzyme producing organisms selected from the class of Erwinia carotovora, Erwinia atroseptica, Erwinia aroideae, Bacillus polymyxa and Streptomyces cellulosae. The slurry is maintained at a pH of 5.2 to 8.5 under proper environmental conditions to organism growth and resultant fibrillation. Termination of the organism activity is effected by heating and the final step involves sheeting of thickened slurry.

3 Claims, No Drawings

MICROBIAL DIGESTION OF TOBACCO MATERIALS

BACKGROUND OF THE INVENTION

In the utilization of plant material, particularly where thin sheets are formed therefrom, such as reconstituted tobacco, particles of the plant material are fibrillated by some mechanical work input means such as beaters, homogenizers or the like. Installations which include work input means to fibrillate particles of plant material are expensive to install, operate and maintain. Where the plant material used is tobacco, generally only the manufacturing waste is employed. Tobacco manufacturing waste consists of various portions of tobacco including particles of lamina, veins, ribs, stems or tobacco dust. All of this material, although useful, is too small or too coarse to be incorporated into a tobacco product. The stems, veins and ribs because of their cellular structure require a considerable amount of mechanical work input to break their cellular structure so that small bundles of fibrils are released therefrom. In the fibrillous form, the stems, veins and ribs may be readily incorporated into the reconstituted tobacco process with little or no further mechanical work.

It is an object of the invention herein to provide a process in which pectin-bound plant material is fibrillated without the substantial use of mechanical work input means.

It is also an object of the invention to provide microbial means for fibrillating pectin-bound plant material such as tobacco while maintaining the natural flavor and aroma thereof.

THE INVENTION

The invention generally contemplates the microbial digestion or disintegration of pectin-bound plant materials, for example, tobacco or other fibrous plant material wherein pectin, the intercellular cement that binds cells to cells and fibers to fibers is broken down so as to separate and form individual plant fibrils for subsequent processing. Plant material, for example tobacco, is subjected to the action of a pectolytic enzyme producing microorganism under controlled conditions of thermal environment, pH, time and moisture. The microbial digestion or disintegration of the pectin-bound plant material is completed after the plant parts exhibit extensive and substantially complete fiber separation. The microbial action is ceased and the plant parts in fibrous form are ready for further processing and treatment.

It has been found that various species of pectolytic enzyme producing microorganisms may be employed for the microbial digestion or disintegration of pectin-bound plant material. Examples of the selected genera are Erwinia, Bacillus and Streptomyces. The following are species that have been found to act on plant material to fibrillate the pectin-bound plant parts and obviate the necessity of employing mechanical work input means to accomplish substantial fibrillation thereof.

| Genera | Species | * ATCC No. |
|---|---|---|
| Erwinia | carotovora | 495 |
| Erwinia | carotovora | 138 |
| Erwinia | carotovora | 17799 |
| Erwinia | carotovora | 8061 |
| Erwinia | carotovora | 15713 |
| Erwinia | atroseptica | 4446 |
| Erwinia | atroseptica | 4446 |
| Erwinia | aroideae | 12286 |
| Erwinia | aroideae | 12312 |
| Bacillus | polymyxa | 842 |
| Streptomyces | cellulosae | 3313 |

* ATCC — American Type Culture Collection Accession Number.

When employing one or more of the microorganisms from the species listed above, it has been found convenient to employ standard media for growing the microorganisms, then when maximum growth of the microorganisms is achieved, the medium containing the microorganisms, i.e., inoculum, is added to the pectin-bound plant material in the presence of sufficient moisture for maintaining optimum growth under controlled conditions of pH, temperature and time.

In the preferred embodiments of the invention herein the pectin-bound plant material employed is tobacco. Various forms of the tobacco in varying degrees and stages of curing may be employed, for example, unredried flue-cured or burley strips, redried flue-cured or burley strips, burley stems, flue-cured stems, manufacturing fines, stalks, shredded tobacco and mixtures thereof.

When practicing the invention herein, tobacco plant parts of varying sizes particularly the stems, veins or ribs are employed. Since the action of the pectolytic enzyme producing microorganisms will cause the fibrillation of these parts at a substantially uniform rate, particles of lamina and tobacco dust which require little, if any, mechanical work input means would be fibrillated in a shorter period of time. To accomplish a microbial digestion or disintegration of tobacco plant parts an inoculum is prepared from a suitable substrate using one of the species listed above. After the microorganism has grown under optimum conditions in the substrate, the inoculum containing viable microorganism is added to the tobacco plant parts such as uncooked stems, veins or ribs and either flue-cured or burley or mixtures thereof under controlled conditions of pH and temperature. The inoculated plant parts which induce pectolytic enzyme formation and activity are subjected to the action of the microorganisms for a sufficient period of time until the disintegration of the parts is substantially completed. This is determined by the consistency and viscosity of the formed slurry. Thereafter, the fibrillated plant parts are mixed with other fractions of tobacco such as particles of lamina and tobacco dust. The mixture is then sized by employing a screening procedure in which the particles are forced through screens having accurate openings. The sized mixture is then made into reconstituted tobacco sheet material.

It has been found that the conditions for effecting substantial fibrillation of plant parts may vary greatly, i.e., depending upon temperature, pH, agitation and aeration. The digestion may be completed after 24 hours or may be completed in from 4 to 6 hours under optimum conditions. The pH of the tobacco slurry is maintained between 5.2 and 8.5, preferably from about 6.5 to 7. The temperature may vary from about 24° to 40° C., preferably from about 28° to 32° C. The tobacco slurry formed may vary greatly but is preferably maintained between 2 and 14 percent solids content on a weight basis, but optimally is maintained at from about 6 to 10 percent solids on a weight basis. It has also been found that disintegration of the plant parts can be accelerated if the inoculated plant parts are aerated and agitated to maintain uniform suspension of tobacco parts with constant mixing and contact with air for optimizing growth conditions of the microorganisms.

To have a better understanding of the invention herein the following examples are provided as specific embodiments thereof. It should be understood that proportions of the various component materials and variation of process steps and conditions may be made without departing from the teaching herein.

EXAMPLE 1

A. Preparation of Inoculum

An extract from burley stems is prepared as follows: 25 g of burley stem is mixed in 250 ml water and is cooked in an autoclave for 25 minutes at 15 psig and 121° C. The resultant liquor is removed and the volume is adjusted to original amount. 1.5 percent agar is added to the liquor and is melted and dispensed into clean containers. The solidified extract of burley stem is sterilized for future use.

A broth of the above extract may be prepared by omitting the addition of agar as listed above. A nutrient dextrose broth (NDB) may also be prepared as follows:

| Nutrient broth | 8 gm |
|---|---|
| Dextrose | 10 gm |
| Distilled water | 1000 ml |

Obviously the media or substrate for growing the particular microorganisms may vary greatly and, therefore, many changes in substrate or combinations thereof are applicable. Maintenance of the microorganisms, particularly the Erwinia carotovora species, has been successfully conducted on tryptone-glucose extract agar slants. These cultures were incubated for 30 to 72 hours at 30° C. prior to use. Liquid media, for example NDB media, was inoculated with physiological salt (0.85 percent) washings from slants, diluted to an optical density of 0.4 as read at 650 $m\mu$ on a spectrophotometer. 2.5 ml of the standardized suspension was added to 250 ml of the liquid broth media (NDB) for culture propagation. Best growth was achieved by employing rotary agitation for 24 hours at 30° C.

B. Microbial Digestion of Tobacco

A water tobacco mixture consisting of 10 percent solids by weight was inoculated with the 10 percent by volume of NDB cultures noted above. The tobacco-microorganism mixture was maintained in a thermal environment of 30° C. for 16 hours and was continuously agitated. The pH of the mixture was maintained between 5.0 and 7.0. After 16 hours the tobacco suspension was substantially fibrillated and was added into the reconstituted tobacco process. The treated tobacco mixture, including the liquor, was then heated to about 190° F. to cease all bacterial enzymatic action. The slurry was then sized by passing through screens having an opening of from 0.016 to 0.012 inch. The sized slurry was then deaerated and cast into a reconstituted tobacco sheet.

EXAMPLE 2

50 grams of burley stem (1/2 to 1-1/2 inches long) was divided into two equal parts. Each part, consisting of 25 grams each, was mixed with 250 ml of tap water in a 500 ml Erlenmeyer flask. Into one flask was placed 25 ml of a 24 hour culture of Erwinia carotovora, ATCC 495 (EC 495) grown in Nutrient Dextrose Broth (NDB). Both flasks with and without EC 495 added were incubated under rotary agitation for 24 hours at ambient temperature. The starting pH of both mixtures before treatment was 5.4. After 24 hours the mixture containing the EC 495, stem and water was observed to be very viscous in appearance with the stem fiber bundles being well separated. The flask which did not contain EC 495 inoculum was observed to contain a marked predominance of intact whole stem. After 24 hours the pH of the uninoculated mixture was 5.8 while the pH of the inoculated mixture was 6.8.

EXAMPLE 3

EC 495 was grown in Nutrient Dextrose Broth (NDB) and maintained under rotary agitation on a rotary shaker at 220 RPM at 30° C. for 24 hours. The culture was then centrifuged for 15 minutes at 9,000 RPM to separate cells from supernatant. The supernatant was removed and saved, being careful to avoid any visible retention of cells in the supernatant. The cellular pellet was then resuspended in 0.85 percent physiological saline and centrifuged as above while discarding the supernatant. This was twice repeated to eliminate culture supernatant from the cell fraction. The cells were then resuspended in physiological saline.

Seventy-five grams of burley stem were divided equally into three 25 gram parts, as in Example 2. Parts A, B, and C were added separately to 250 ml aliquots of water in 500 ml Erlenmeyer flasks, wherein the mixture pH was 5.2 to 5.4. The supernatant from the first centrifugal separation was added in a 25 ml quantity to Part B. The resuspended cellular pellet was readjusted to its pre-centrifuged volume and 25 ml was added to Part A. Neither cells nor supernatant were added to Part C. Parts A, B, and C were then held under agitation at 220 RPM (equipment as in Example 2) for 24 hours at 30° C. After 24 hours incubation, the following was observed:

| Part | General Appearance | | Quality of Stem Digestion |
|---|---|---|---|
| | 0 Hours | 24 Hours | |
| A | whole stem | viscous | Excellent |
| | | | No intact whole stem |
| B | whole stem | slightly viscous | Poor |
| | | | Many intact whole stems |
| C | whole stem | whole stem | None |
| | | | All whole stem |

At termination the pH of parts A and B were 6.8–7.2 while that of Part C was 5.8.

EXAMPLE 4

25 gram portions each of flue-cured fines, burley fines, turkish tobacco, manufacturing fines and winnowers were separately added to 250 ml quantities of tap water as in Example 2. A culture of EC 495 grown as in Example 3 was separated into 6–25 ml quantities. Each tobacco-water mixture was then inoculated with 25 ml each of EC 495 culture. All flasks were agitated as in Example 3. All mixtures exhibited a viscous appearance in which excellent digestion had occurred. Subsequently, each mixture was hand cast as follows: A 100 ml quantity of each treated mixture was mixed in a quart size Waring blender (Model 5011) cup with 100 ml of water for 3 minutes to obtain a slurry. Separately each slurry was then evenly spread to dry on a stainless steel sheet mounted over a steam bath. After drying, none of the mixtures as cast sheets exhibited large fiber bundles.

EXAMPLE 5

240 grams each of flue-cured and burley stems, each from a common batch, were added to four separate containers (A, B, C and D) in which 6 liters of tap water had been placed. 600 ml of EC 495 inoculum prepared as in Example 3 was added to each container. The following conditions applied to the containers:

| Container | Internal Shaft Agitation (RPM) | Internal Air Ring Aeration (L/min) | Treatment Temp. (°C.) |
|---|---|---|---|
| A | 680 | None | 30 |
| B | None | 9 | 30 |
| C | 680 | 4.5 | 30 |
| D | 680 | 9.0 | 30 |

Initial pH of all mixtures was 5.4. After 6 hours the following was observed:

| Container | pH | General Appearance | Quality of Stem Digestion |
|---|---|---|---|
| A | 6.8 | Moderately viscous | Good |
| B | 6.2 | Slightly viscous | Fair-Good |
| C | 6.7 | Moderately viscous | Good |
| D | 6.8 | Viscous | Excellent |

Hand cast sheets, prepared as in Example 4 indicated greatest whole stem degradation to be in Container D. The best quality cast sheet was also made from materials out of Container D.

EXAMPLE 6

Burley and flue-cured stem were treated as in Example 5 except that the pH of the stem-water mixture in Containers A and B was elevated from 5.3 to 7.0 with NH$_4$OH, prior to addition of EC 495 inoculum. Tobacco materials in C and D were not pH altered. The following digestion occurred by the fourth hour of treatment:

| Container | pH Adjusted | Internal Shaft Agitation (RPM) | Internal Air-ring Aeration (L/min) | General Appearance | Quality of Stem Digestion |
|---|---|---|---|---|---|
| A | Yes | 680 | 9 | highly viscous | excellent |
| B | Yes | 680 | 9 | highly viscous | excellent |
| C | No | 680 | 9 | slightly viscous | good |
| D | No | 680 | 9 | slightly viscous | good |

EXAMPLE 7

A stainless steel cylindrical tank was charged with 298 pounds water, 26.56 pounds of burley stem and 33.2 pounds of EC 495 culture. The EC 495 culture was prepared as in Example 2 and was increased in volume by transfer to 6 liter flasks of NDB. The 6 liter flasks contained 3,000 ml of NDB and, subsequent to inoculation, were incubated at 30° C. while being maintained on a rotary shaker at 120 RPM prior to use on stem. The tank contents, with an initial pH of 5.4 were agitated at 111 RPM and aerated at 9 liters/minute for 16 hours. Agitation was accomplished with an internal marine blade mounted on a stainless shaft driven with a "LIGHTNIN Mixer" (Model NDIA) and aeration was achieved with a multiple outlet circular stainless tubing placed at the tank bottom. At the 14th hour digestion of stem material was complete as indicated by the high viscosity of the medium and the excellent quality of stem breakdown.

EXAMPLE 8

Tobacco stem digestion was accomplished as in Example 2, employing as inoculum other species which are pectolytic enzyme producing microorganisms. Inoculum was prepared as in Example 1. These strains are Bacillus polymyxa ATCC 842 and Streptomyces cellulosae ATCC 3313.

EXAMPLE 9

Stem digestion by other *Erwinia* strains was accomplished as for EC 495 in Example 1 except that 25 g each of flue-cured and burley stem were treated. These strains are *Erwinia aroideae* (ATCC Nos. 12286 and 12312), *Erwinia carotovora* (ATCC Nos. 138, 17799, 8061 and 15713) and *Erwinia atroseptica* (ATCC No. 4446). *E. aroideae* (ATCC No. 12286) and *E. carotovora* (ATCC No. 15713) exhibit digestion capabilities closely approximating those of EC 495 with the former being best.

EXAMPLE 10

Inoculum levels from 5 to 20 percent concentrations by volume were employed in the digestion of burley: flue-cured stem mixtures. Conditions of these experiments were as for Example 4 except that agitation of all mixtures was at 680 RPM and aeration of all mixtures was at 9 L/min. The following table illustrates the effect of differing inoculum levels over 7.5 hours:

| Time (hrs) | % Inoculum | Quality of Stem Digestion |
|---|---|---|
| 0 | 5 | None |
|  | 20 | None |
| 4 | 5 | Fair |
|  | 20 | Excellent |
| 7.5 | 5 | Excellent |

The higher the initial inoculum the less time required for digestion to take place.

EXAMPLE 11

Concomitant with digestion of burley: flue-cured stem mixtures over a 7.5 hour treatment period with EC 495, the nitrate level of stem slurry was decreased with increasing inoculum levels. For an initial nitrate level of 4.63 percent the following changes were observed at 7.5 hours.

| Inoculum Level | Nitrate (%) |
|---|---|
| 5% | 2.49 |
| 10% | 1.26 |
| 15% | 0.68 |
| 20% | 0.45 |

EXAMPLE 12

Burley: flue-cured stem were treated as in Example 5-D at varying stem percent levels. The following table summarizes the stem levels successfully treated over 7.5 hours:

| Consistency % | General Appearance | Quality of Stem Digestion |
|---|---|---|
| 2 | Viscous | Excellent |
| 8 | Viscous | Excellent |
| 10 | Moderately viscous | Good-Excellent |
| 13 | Slightly to moderately viscous | Good |

These data show that the higher percent levels of tobacco solids in the tests above are not completely digested in 7.5 hours but even at 13 percent solids, the digestion is of good quality.

EXAMPLE 13

Flue-cured and burley stems were treated as in Example 5 over a 16-hour period at an agitation rate of 380 RPM and without additional aeration. The following table indicates reductions in the nitrate fraction of the mixture.

| Container | Total Stem Weight (gm) | Time (hrs) | Nitrate (%) |
|---|---|---|---|
| A | 420 | 0 | 4.67 |
|   |   | 16 | 1.11 |
| B | 480 | 0 | 6.57 |
|   |   | 16 | 2.13 |

EXAMPLE 14

Flue-cured and burley stems were treated as in Example 13 but in 1,200 g quantities each. The following table illustrates the nitrate reductions achieved.

| Time (hrs) | Nitrate (%) |
|---|---|
| 0 | 4.58 |
| 16 | 0.51 |

As noted from the examples herein, aeration of the inoculated tobacco mixture together with agitation not only accelerates the digestion or disintegration of the plant parts but it also makes them more suitable for preparing reconstituted tobacco sheet of good quality for incorporation into tobacco products. It has also been found that the microbial digestion significantly reduces the nitrate content of tobacco and maintenance of a pH of about 7 is optimum for tobacco mixtures.

The following are examples of pilot plant runs in which the tobacco mixture after inoculation was continuously aerated and agitated until digestion was considered completed. A total of 1,750 lbs. of material was treated consisting of 1,480 lbs. of water, 70 lbs. of flue-cured stems, 50 lbs. of burley stems and 150 lbs. of inoculum (12 lbs. of which was burley stems). The mixture of materials was treated in a 290 gallon tank fitted with an aeration line and an overhead mounted motor with center drive agitation to facilitate uniform suspension of the stem material and accelerate disintegration thereof. The agitation was maintained at 260 RPM and air bubbled through the mixture at a rate of 8 cubic feet per minute. After the microbial action was completed the viscous fibrous mass was passed through a wet hammermill fitted with sizing screens of 0.016 and 0.012 inch openings. 3 percent by weight of glycerine was added and the mixture was then made into reconstituted tobacco. The enzyme activity, viable bacterial count and pH is set forth in the table below with the physical properties of the slurry and sheet after a 5 hour treatment.

MICROBIOLOGICAL PROPERTIES OF THE SLURRY AND PHYSICAL PROPERTIES OF THE SLURRY AND SHEET

Microbiological Properties of the Slurry

| Sampling Time (Hours) | pH | (1) Pectinase Activity (secs) | *(2) % Change In Pectin Solution Viscosity | Viable Bacterial Count ($\times 10^6$) |
|---|---|---|---|---|
| 0 Before | 5.2 | 23.0 | 0 | 0.125 |
| Inoculum | 6.4 | 4.5 | 80 | 7,800.0 |
| 0 After | 5.8 | 8.1 | 64.8 | 780.0 |
| 1 Hr. after | 5.8 | 7.6 | 66.0 | 880.0 |
| 2 Hrs. after | 6.0 | 8.9 | 61.0 | 930.0 |
| 3 Hrs. after | 6.1 | 7.2 | 69.0 | 1,040.0 |
| 4 Hrs. after | 6.3 | 7.3 | 68.0 | 1,240.0 |
| 5 Hrs. after | 6.3 | 6.8 | 70.0 | 1,890.0 |

DETERMINATION OF PECTINASE ACTIVITY

1. A tobacco slurry is spun down in a centrifuge. The liquid is retained and the pH is adjusted to 8.0. A 5.0 ml quantity is added to a 20 ml pectin solution prepared in deionized water on an 8g/liter basis and adjusted to a pH of 8.0. A measured volume of the mixture is drawn into a calibrated pipette and its descent is timed (secs). The speed of descent is compared to that of a standard pectin-water (20 ml;5 ml) mixture. Speed of descent is a measure of solution viscosity reflecting the degradation of the pectin polymer. A short (5.0–6.0 sec.) descent time represents high pectinase activity while a longer time (20–25 sec.) reflects lower activity. This procedure is repeated after the pectin-water mixture stands for 0, 5 and 10 minutes.

2. Viscosity of water is 5, therefore, a percent change greater than approximately 80 percent is not possible.

Physical Properties of the Slurry & Sheet

| Brookfield Viscosity Centipoises | % Minus 100 Mesh U.S. Standard Sieve Screen | Consistency (wt./wt.) | Stem Disintegration |
|---|---|---|---|
| 52,400 | 2.63 | 6.7 | Good-Excellent |

Cast Sheet (5 Hour Treatment)

| Thickness (0.001") | Net Tensile (gm/mm²) | Density (gm/cc) | Flex [f(200)] |
|---|---|---|---|
| 9.3 | 198 | 0.57 | 203 |

Reconstituted sheets manufactured by the method described above hereinafter referred to as the microbial sheet, were compared with reconstituted tobacco sheet material made according to the process described above but without the microbial treatment hereinafter referred to as the control sheet. Two identical samples of tobacco material were placed in a 43 gallon tank which was fitted with an agitator as described above and aerated with 8 cubic feet of air per minute. The tobacco mixtures were treated for 16 hours after inoculation with EC 495. After 16 hours the treated mixture was added to other tobacco materials and the mixture was passed through 0.016 to 0.012 inch screens of a wet hammermill. The mixture was divided into two equal parts, part A having 2 percent glycerin added, and part B having 4 percent glycerin added. The two parts were cast into sheets and evaluated separately. The control sheet was treated similarly to the microbial sheet but without the use of inoculum.

The physical properties of the control and microbial treated reconstituted tobacco were measured by normal techniques and are shown in the table below:

Comparative Physical Properties of Pilot Plant Sheets

| Production Method | Glycerin (%) | Net Tensile (g/mm²) | Flex f(200g) | Thickness (0.001") | Density (g/cc) |
|---|---|---|---|---|---|
| Control 2 (without Bacterial tmt) |   | 146 | 33 | 18.5 | 0.48 |
|   | 4 | 117 | 75 | 19.3 | 0.46 |
| Bacterial Treatment (Experimental) | 2 | 239 | 268 | 7.7 | 0.55 |
|   | 4 | 310 | 607 | 11.8 | 0.68 |

The sheet material made according to the control procedure and the sheet material made according to the microbial treatment were incorporated with production shredded tobacco and sample cigarettes made therefrom. The cigarettes were smoked and evaluated by a smoke panel. It was found that a noticeable smoothing out of the tobacco smoke was observed in the cigarettes containing microbial treated reconstituted tobacco when compared with the control cigarettes. Also, the pH of the smoke aerosol of the cigarettes containing microbial treated reconstituted tobacco was more alkaline than the smoke of the control cigarettes.

Although this invention has been described with respect to the preferred embodiments, changes and modifications can be made which are within the full scope of this invention.

We claim:

1. A method of forming a reconstituted tobacco sheet employing (microbial digestion of tobacco) material which comprises:
   A. Subjecting a water slurry of tobacco material to the action of a quantity of pectolytic enzyme-producing microorganisms selected from the class consisting of Erwinia carotovora, Erwinia atroseptica, Erwinia aroideae, Bacillus polymyxa and Streptomyces cellulosae, said microorganisms being dispersed in said slurry in concentrations of from 5 to 20 percent by volume, and maintaining said microorganism and slurry at a pH between 5.2 and 8.5 and a temperature of from 24° to 400° C for up to 24 hours while aerating and agitating the slurry, to allow the microorganisms to grow and act on said tobacco until the pectin is broken down so as to form a thicker slurry of fibrous tobacco material, the fibers of the tobacco material being substantially unaffected by the microorganism in the slurry;
   B. Heating said slurry to a temperature sufficient to terminate the activity of the microorganism; and
   C. Casting the entire slurry mixture and then drying into a reconstituted tobacco sheet.

2. The method of claim 1 wherein the plant slurry is maintained between 2 and 14 percent solids content by weight.

3. The method of claim 1 wherein the pectolytic enzyme producing microorganism is Erwinia carotovora.

* * * * *